United States Patent [19]

Sevack et al.

[11] Patent Number: 5,401,125
[45] Date of Patent: Mar. 28, 1995

[54] INCREASING TAPER PLUG CUTTER

[76] Inventors: Lloyd Sevack, 29 Cramer Drive, Nepean, Ontario, Canada, K2H 5X2; Thomas S. Gardiner, 35 Holland Avenue, Apt. 210, Ottawa, Ontario, Canada, K1Y 210

[21] Appl. No.: 234,171

[22] Filed: Apr. 28, 1994

[51] Int. Cl.$^6$ ............................................... B23B 51/04
[52] U.S. Cl. .................................. 408/203.5; 408/204
[58] Field of Search .................... 408/203.5, 204, 207, 408/703

[56] References Cited

U.S. PATENT DOCUMENTS

| | | |
|---|---|---|
| 117,786 | 8/1871 | Kniffen . |
| 473,231 | 4/1892 | Leffel . |
| 475,560 | 5/1892 | Heydenreich . |
| 476,312 | 6/1892 | Resche . |
| 1,494,897 | 5/1924 | Freye .................. 408/204 |
| 2,027,139 | 1/1936 | Abramson et al. . |
| 2,748,817 | 6/1956 | Stearns . |
| 2,978,002 | 4/1961 | Ransom . |
| 3,130,763 | 4/1964 | Schlosser et al. . |
| 4,295,763 | 10/1981 | Cunniff . |
| 4,452,554 | 6/1984 | Hougen . |
| 4,573,838 | 3/1986 | Omi et al. . |
| 4,595,321 | 6/1986 | Van Dalen . |
| 4,767,244 | 8/1988 | Peterson . |
| 5,213,456 | 5/1993 | Lee .................. 408/203.5 |

FOREIGN PATENT DOCUMENTS

| | | |
|---|---|---|
| 1040092 | 10/1953 | France . |
| 2535635 | 5/1984 | France .............. 408/203.5 |
| 293770 | 3/1915 | Germany . |
| 1159724 | 6/1985 | Russian Federation ............ 408/204 |
| 1766653 | 10/1992 | Russian Federation ............ 408/204 |
| 81021 | 7/1934 | Sweden ............................... 408/204 |
| 3726 | of 1869 | United Kingdom ................. 408/204 |

OTHER PUBLICATIONS

Trend Routing Technology Catalog, p. 43 (undated).
Brochure, Woodworkers Supply, Inc. (Facsimile date of Aug. 6, 1993).
Brochure, Marke Fisch (Facsimile date of Aug. 24, 1993).

*Primary Examiner*—Daniel W. Howell

[57] ABSTRACT

A woodworking tool for cutting plugs having a shank, a generally cylindrical body, and a plurality of blades defining an internal longitudinal bore having a rounded portion, a constant diameter portion and a flared portion with an increasing angle of curvature.

15 Claims, 1 Drawing Sheet

INCREASING TAPER PLUG CUTTER

BACKGROUND OF THE INVENTION

This invention relates to cutters for forming wooden plugs. As is disclosed in U.S. Pat. No. 5,213,456 issued to Lee, woodworkers and carriage makers long have inserted wood plugs cut across the grain of wood in countersunk screw holes, or similar holes, to hide the screw or otherwise fill or conceal the hole. Plugs cut from across the wood grain are more desirable than plugs cut from end grain, such as dowels, because cross grain plugs more closely match the grain and texture of the wood being plugged, and when stained or otherwise finished, provide a nearly invisible plug.

Two types of plugs have been long known, cylindrical plugs with straight sides and tapered plugs with sides that narrow slightly. Various chamfers have been used on both cylindrical and tapered plugs. For example, U.S. Pat. Nos. 117,786, 473,231, 475,560, 476,312, 2,748,817, 3,130,763, and 4,595,321 describe plug cutters that will cut cylindrical plugs. U.S. Pat. Nos. 2,027,139 and 4,295,763 describe plug cutters that will produce tapered plugs. However, neither plug type has been entirely satisfactory. Cylindrical plugs must necessarily be made slightly smaller than the hole being plugged so that the plug can be inserted easily. This size difference frequently leaves a small, noticeable gap between the plug and the hole side, particularly because tolerances are difficult to control in forming both the cylindrical plugs and the holes that are to receive the plugs. For instance, this gap is magnified if the hole is not perfectly round. Furthermore, cylindrical plug cutters tend to tear and burn rather than cut the fibers on the side of the plug. This tearing and burning produces a roughened plug, thereby causing a poor fit, difficult insertion, and voids that can be exposed when the top of the plug is finished level with the workpiece.

In addition, inserting a cylindrical plug often involves tilting the plug, thereby crushing the fibers on one side of the hole and producing a noticeable gap. Finally, cylindrical plugs tend to rotate during the final step of insertion, when they are typically tapped into place, thereby causing the grain of the plug to be misaligned with the grain of wood of the workpiece into which the plug is being inserted. This misalignment causes the plug to be much more noticeable and is therefore undesirable.

Constant-taper plugs also have drawbacks. Although tapering the plug helps to reduce the gap between the plug and the side of the hole, tapered plugs contact the workpiece only at a thin ring adjacent to the finished surface, which allows the plug to rock within the hole and sometimes does not provide an adequate gluing surface. Consequentially, tapered plugs are not as secure as cylindrical plugs and may work loose or cause an uneven finished surface. Indeed, surface sanding of the plug and adjacent area after the plug has been secured can destroy the ring of contacting surface, causing the tapered plug to be loosened or revealing a gap between the plug and workpiece.

U.S. Pat. No. 4,295,763 (Cunniff), describes a device that cuts a large diameter plug with two different tapers for plugging holes bored in exterior walls for the insertion of insulation into the wall cavities. However, the Cunniff device does not solve the above-described problems associated with prior art plugs because plugs cut with the Cunniff device are not appropriate for conventional woodworking applications and are inserted with the steeper taper first (that thus functions as a chamfer). As a result, the second taper contacts the hole side and there is minimum contact between the plug itself and the side of the hole, reducing the gluing surface and increasing the likelihood that the plug will rock.

Additionally, tapered plugs often lock-up over different distances depending on the type of wood the plug is used in and the degree of taper. For instance, in hardwood, lock-up occurs relatively early with a low angle taper, such as 3°, as the compression of the plug and surrounding wood will take place over a relatively short distance. Conversely, however, in softwood, such a low angle taper prevents lock-up until a greater distance is covered, thus a higher taper angle, such as 5°, is desirable. One possible solution to this problem is to provide two different sets of plug cutters, one set at a low taper angle for hardwood, and another set at a relatively higher taper angle for softwood. Of course, this solution is both expensive, in that plug cutters of different sizes and angles must be maintained, and time consuming as those different plug cutters must be switched out for different types of wood.

SUMMARY OF THE INVENTION

The present invention is a device for cutting plugs that have a flared portion with an increasing angle of curvature. From the shank of the device to the tips of the cutting blades, the blades of the device have an increasing radius of curvature that may be derived from a circular, hyperbolic, parabolic or elliptical arc. Alternatively, a two-stage, constant-taper flared portion may be used. The resulting plug may be used for either hardwood or softwood. In hardwood, the plug will lock-up early with much of it subsequently being pared flush. As the greater angled portion of the plug meets more resistance in softwood, however, the plug locks up only upon insertion of the steeper angled portion of the plug. The flared portion of the plug cut with the present invention completely fills the mouth of the hole and eliminates any gap between the hole and the plug. In addition, the use of the low angle flared portion reduces the tendency of the plug to rotate when the plug is tapped into place (and is no longer being held to prevent rotation). The plug cutter of the present invention forms the surface of the flared portion by first cutting the fibers and then shaving the plug sides, producing a smooth plug that is easier to insert and has a minimal number of voids that might be exposed when the workpiece is finished.

Finally, the present invention incorporates a small hole through the center of the shank leading into the bore. Inserting a punch into the hole through the shank to push the wedged plug out from behind, the user may thus extract a wooden plug that has sheared and wedged into the plug cutter.

Accordingly, one objective of the present invention is to provide a plug cutter that produces plugs with an increasing angle of curvature that can be used with both hard and soft woods.

A further objective of the present invention is to provide a plug cutter that produces plugs that do not rotate during insertion.

Another objective of the present invention is to provide a plug cutter that has a hole through the shank by which the user may eject a wedged plug with a punch.

These and other objectives and advantages of the present invention will become apparent from the detailed description and claims that follow.

DETAILED DESCRIPTION OF THE DRAWINGS

Figure 1:
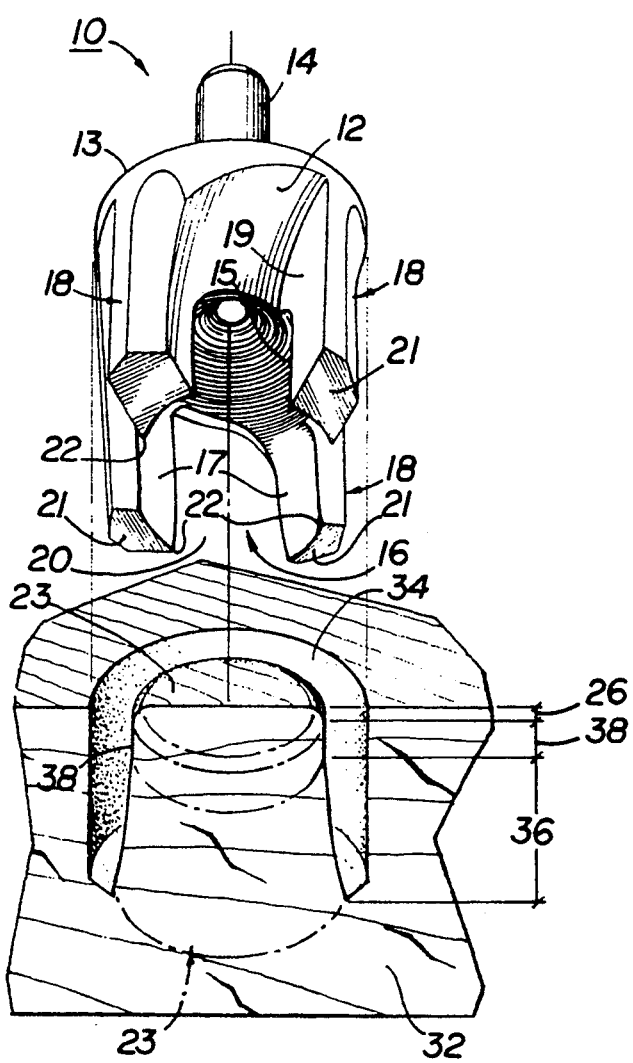
FIG. 1 is a worm's eye perspective view of the plug cutter of the present invention exploded away from a sectioned bird's eye perspective view of a workpiece.
Figure 2:
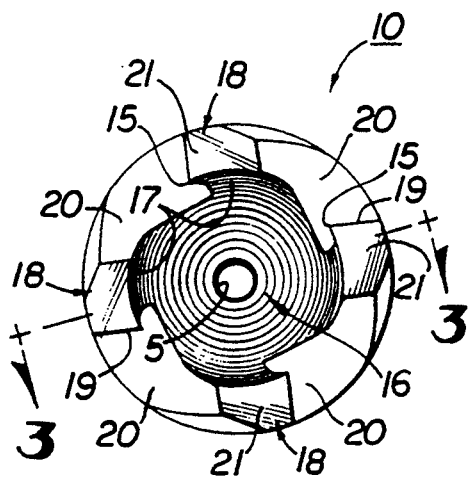
FIG. 2 is a bottom plan view of the plug cutter of FIG. 1.

FIG. 1 illustrates the plug cutter 10 in an exploded perspective view. Plug cutter 10 includes a body 12 and a shank 14 attached to body 12 at shoulder 13. Plug cutter 10 is used by inserting shank 14 in a drill press chuck (not illustrated) or similar means for rotating plug cutter 10.

Body 12 has an upwardly extending bore 16 defined by a plurality of spiral or helical blades 18, angled in the direction of rotation of plug cutter 10, and attached at shoulder 13. The leading face 19 of each blade 18 (assuming clockwise rotation when looking at shank 14 of plug cutter 10) intersects with dished end 21 of blade 18 to define cutting edge 22. The diameter of the circle defined by the outermost position of edges 22 during plug cutter 10 rotation is substantially the same as the diameter of shoulder 13.

Figure 3:
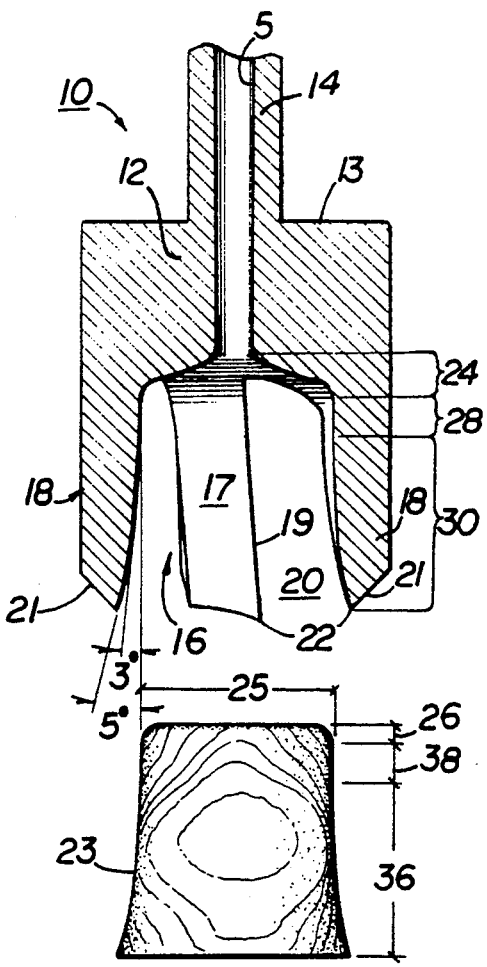
FIG. 3 is a section taken along lines 3—3 in FIG. 2 with a section view of a plug cut by use of the plug cutter exploded away from the plug cutter.

As can be seen in FIG. 3, the diameter of bore 16, which is defined by the interior faces 17 of blades 18, varies along the length of bore 16. Travelling longitudinally along bore 16 from section 24, the diameter of bore 16 may remain constant at the nominal diameter of plug 23 for a short length 38, thereby defining cylindrical section 28. Continuing from cylindrical section 28, the diameter of bore 16 increases at an increasing angle of curvature until reaching cutting edges 22, thereby defining flared section 30. As illustrated in FIG. 3, the flare of the blades 18 ranges from 3° proximate the constant diameter portion to 5° proximate the helical blades 18. Of course, the flare can be varied by using different curves, such as portions of a circle, ellipsis, parabola or hyperbola, to create the increasing angle of curvature.

Shank 14 has a small hole 5 through the center of the shank leading into bore 16, thereby allowing the user to insert a punch to remove a wedged plug.

When used, shank 14 is inserted in a drill press or similar means and plug cutter 10 is rotated. Cutting edges 22 of rotating plug cutter 10 are then pressed into contact with material 32, cutting a round groove 34 that has an interior diameter substantially equal to that of bore 16 at cutting edges 22. As plug cutter 10 and edges 22 progress deeper into material 32, scraping edges 15 defined by leading faces 19 and interior faces 17 of blades 18 shave plug 23, producing a smooth flared surface 36. Waste removed by cutting edges 22 and scraping edges 15 escape through slots 20. Finally, as plug cutter 10 is fully lowered into material 32, scraping edges 15 of cylindrical section 28 of blades 18 shave plug 23, producing a smooth cylindrical portion 38 on plug 23 and domed section 24 of blades 18 shave an eased edge 26 at the end of plug 23.

Figure 4:
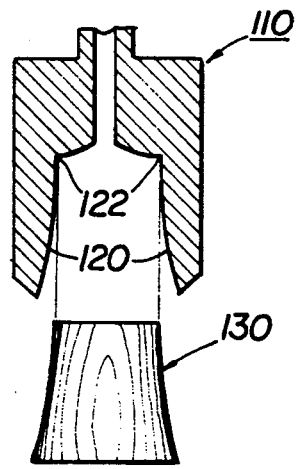
FIG. 4 is a section taken along lines 3—3 in FIG. 2 with a section view of an alternative embodiment of the present invention showing a plug cut by use of the alternative embodiment exploded away from the plug cutter.

Alternatively, as illustrated in FIG. 4, a plug cutter 110 can be provided with neither cylindrical section 28 or eased edge 26. The resulting plug 130 has neither chamfers or a constant diameter portion. Instead, increasingly flared curve 120 starts its flare immediately at edge 122.

This description is given for purposes of illustration and explanation. It will be apparent to those skilled in the relevant art that modifications and changes may be made to the invention as described above without departing from its scope and spirit.

We claim:

1. A plug cutter comprising a shank connected to a body and a plurality of blades depending from the body that define a bore having, progressing away from the body, a flared portion with an increasing angle of curvature that terminates at tips that define a mouth that is wider than any other portion of the bore.

2. The plug cutter of claim 1 wherein a constant diameter portion progresses away from the body and leads to the flared portion.

3. The plug cutter of claim 1 wherein the increasing angle of curvature of the flared portion is derived from a curve.

4. The plug cutter of claim 1 wherein the shank has a coaxial hole giving access to the bore.

5. A plug cutter comprising:
   (a) a shank;
   (b) a body having a shoulder; and
   (c) a plurality of helical blades having tips containing scraping edges that define a longitudinal bore within the body, the bore having, progressing from the body, a flared portion with an increasing angle of flare.

6. The plug cutter of claim 5 wherein a constant diameter portion progresses away from the body and leads to the flared portion.

7. The plug cutter of claim 6 wherein the increasing angle of curvature of the flared portion is derived from a curve.

8. The plug cutter of claim 6 wherein the shank has a coaxial hole giving access to the bore.

9. A plug cutter comprising a shank connected to a body and a plurality of blades depending from the body that define a bore having a constant diameter portion progressing away from the body and leading to a flared portion with an increasing angle of curvature that terminates at tips that define a mouth that is wider than any other portion of the bore, wherein the flared portion flares at approximately 3° proximate the constant diameter portion and at approximately 5° proximate the tips.

10. A plug cutter comprising:
    (a) a shank;
    (b) a body having a shoulder; and
    (c) a plurality of helical blades having tips containing scraping edges that define a longitudinal bore within the body, the bore having a constant diameter portion progressing from the body and leading to a flared portion with an increasing angle of flare that flares at approximately 3° proximate the constant diameter portion and at approximately 5° proximate the tips.

11. A plug cutter for cutting a plug comprising a shank connected to a body and a plurality of blades depending from the body that define a bore, having a top section for forming an eased edge upon the plug, the bore progressing away from the body and leading to a flared portion having an increasing angle of curvature that terminates at tips that define a mouth that is wider than any other portion of the bore, which is accessible through a hole piercing the body.

12. A plug cutter according to claim 11 in which the hole is coaxial with the shank and is sized to allow a punch to be inserted for removing the plug.

13. A plug cutter according to claim 11 in which slots separate the blades from each other in order to allow waste to exit.

14. A plug cutter according to claim 11 in which the body defines a cylindrical shoulder.

15. A plug cutter according to claim 14 in which each blade defines an outer surface that is coplanar with the shoulder.

* * * * *